Sept. 25, 1956          G. X. LENS                2,764,275
        CONVEYING DEVICE FOR LETTERS AND SIMILAR FLAT OBJECTS
              IN PARTICULAR INTERMEDIATE CONVEYING DEVICE
Filed Dec. 18, 1951                          7 Sheets-Sheet 4

Inventor
G. X. LENS

By Robert Harding Jr.
                Attorney

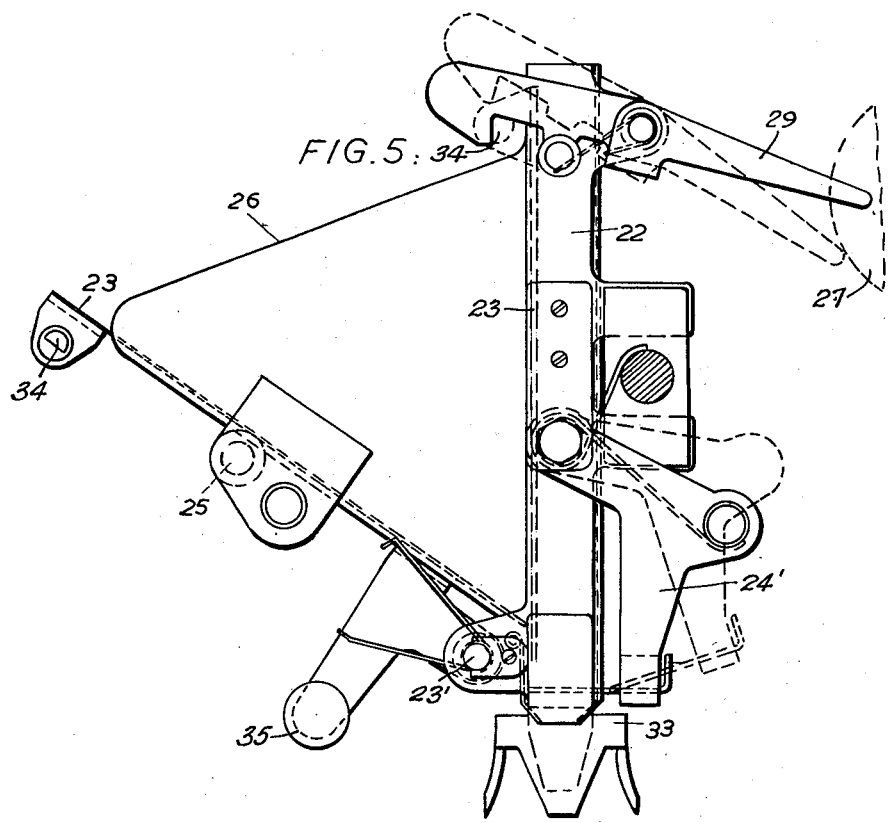

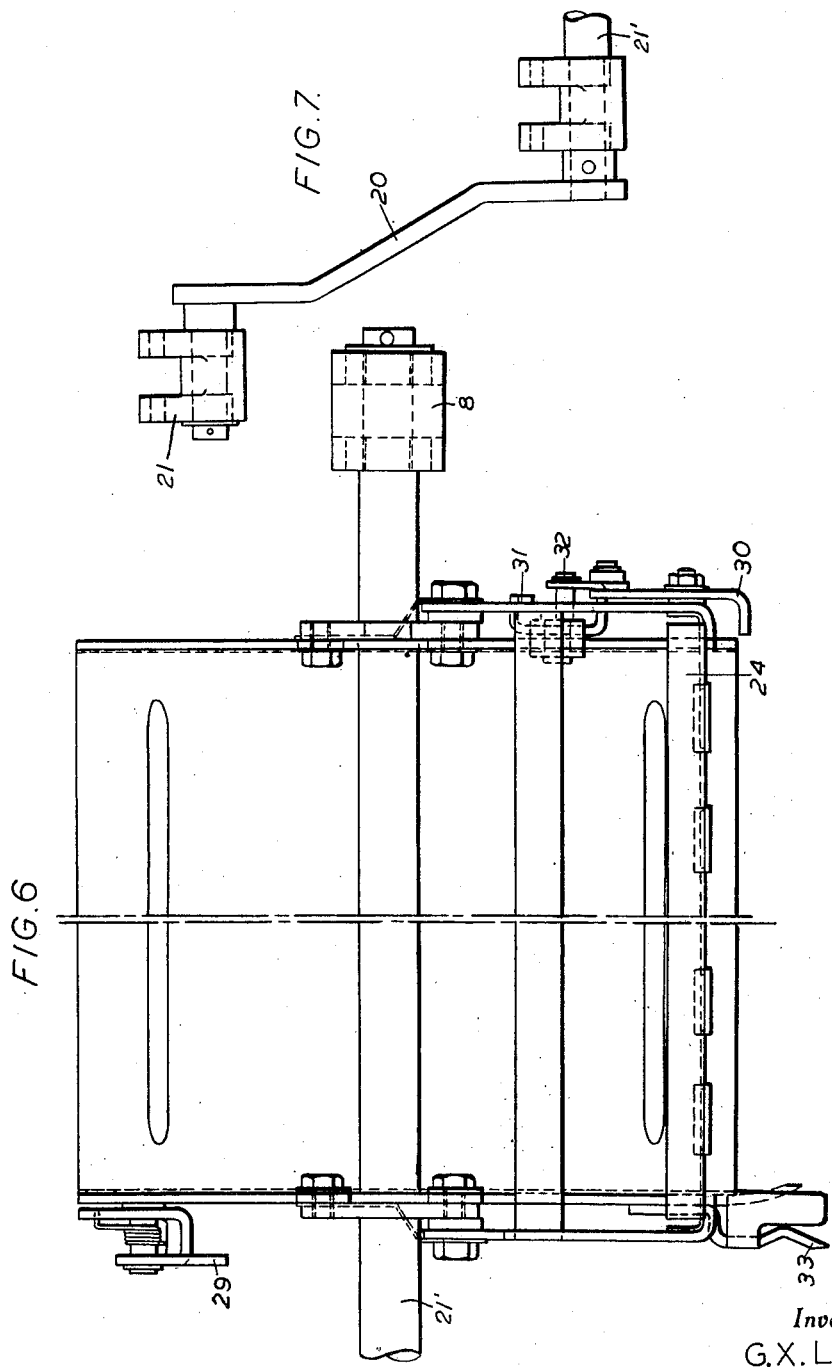

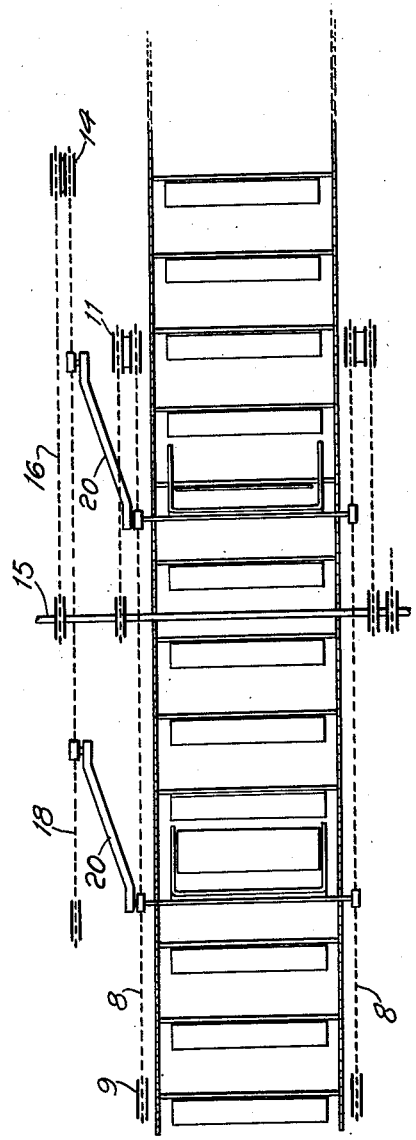

United States Patent Office 2,764,275
Patented Sept. 25, 1956

2,764,275

CONVEYING DEVICE FOR LETTERS AND SIMILAR FLAT OBJECTS IN PARTICULAR INTERMEDIATE CONVEYING DEVICE

Georges Xavier Lens, Antwerp, Belgium, assignor to International Standard Electric Corporation, New York, N. Y., a corporation of Delaware Application December 18, 1951, Serial No. 262,209

Claims priority, application Netherlands December 18, 1950

3 Claims. (Cl. 198—143)

The present invention relates to a conveying device for letters and similar flat objects, in particular intermediate conveying device, for use in a letter sorting machine operated with an endless common conveyor chain which is provided with a large number of letter-holders or so-called "portefeuilles" arranged to convey the documents to be sorted from a number of sorting positions to any of a plurality of receptacles which correspond with a predetermined destination.

Usually several sorting positions are allotted to such machines which positions are located centrally and on which the sorter sorts the received objects in accordance with their destination. In the existing embodiments, the sorter has a keyboard enabling him to record the code number corresponding with the destination whereby the further transport of the sorted object is so controlled that finally this object is delivered by the main conveyor chain to the receptacle of the destination. This creates the problem for depositing the object which leaves a sorting position at a given moment, via an intermediate conveying device into those letter-holders of the main chain which successively come at the disposal of the sorter under consideration.

The object of the invention is to solve this problem in a simple and reliable manner and to provide an intermediate conveying device having sufficient flexibility of operation.

This is done by means of a simple conveyer system intermediate the sorting position and the main conveyor.

In accordance with the invention, the intermediate conveying device comprises three differently driven endless chains of equal length which may be moved on in parallel planes between two of which juxtaposed chains, a plurality of letter-holders are mounted at regular intervals while the third chain is staggered with respect to the other two, and this third chain so cooperates with the other two that during the cyclic movement of both first mentioned chains, all letter-holders remain in the same position.

In accordance with another feature of the invention, the letter-holders of the intermediate chain are connected with equidistant points on the third chain by means of rigid straps of such equal length that, during the movement of both carrier chains, these letter-holders are kept in a vertical position.

The box-shaped letter-holders are closed by a bottom outlet flap, while opening and closing of this flap are controlled by external members. In accordance with a further feature of the invention, a movable sidewall of these letter-holders may take up an inclined position, or a vertical position, in such a way that a letter coming into contact with this sidewall in its inclined position, may be brought into the vertical position so as to rest on the outlet flap during the movement of the carrier chains.

In accordance with a feature of the invention the movement of the side wall from one position into the other and vice versa, is controlled by two members located alongside the trajectory of the carrier chains.

The invention will be described with reference to the drawings in which by way of example a single embodiment of the invention is shown.

Fig. 5 shows a rear view seen from the other side;

Fig. 6 is a side elevation of this letter-holder;

Fig. 7 shows a plan view of one of the straps serving to maintain the letter-holders in a vertical position, and finally Fig. 8 shows a plan view of the various chains of Fig. 2 diagrammatically represented.

For the sake of convenience, the word "letters" will be used instead of "objects," though the invention is not restricted thereto.

Figure 1:
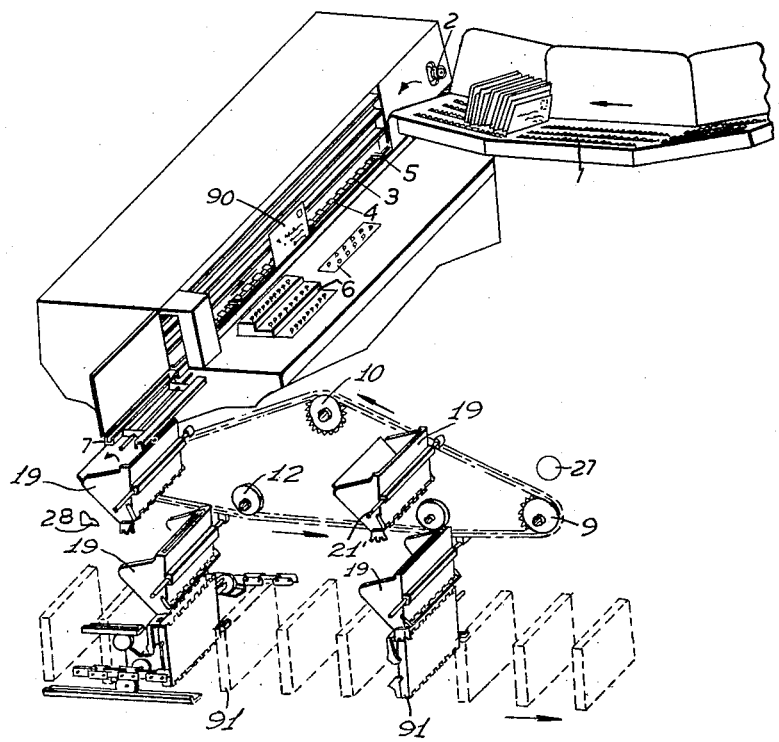
Fig. 1 represents a perspective view of the main components of the sorting machine.

Since furthermore some components of the sorting machine shown in Fig. 1, form the subject matter of inventions described in separate co-pending patent applications, only a brief description of these components is deemed sufficient here.

In Fig. 1 the pile of letters is placed at the right-hand side of each sorter, and these letters are automatically advanced by means diagrammatically indicated by 1. From this pile, one letter is brought each time by means of a pneumatic suction device 2 into a U-shaped channel 3 through which, by means of an endless chain 4 provided with fingers 5 at regular intervals, the letter is passed along the sorter in an intermittent movement during which the letters are stopped each time for a moment. During this stopping period, the sorter who, therefore, does not need to take up the letters with his hand, may read the destination written on the letter envelope and thereupon record a code number corresponding with the destination onto a keyboard 6. It is essential that this recording be terminated by the time the next letter again momentarily stops in front of the sorter. These features are described in greater detail in applications of the same inventor, Serial No. 262,207, and now Patent No. 2,689,657, and Serial No. 262,208, both filed December 18, 1951.

Subsequently, a transfer mechanism arranged as a turnstile which is also rotated intermittently around its shaft, is arranged to receive one letter at a time from the chain 4 and causes the letters to be passed one by one upon tilting a short U-shaped channel 7, in which the letter rests for a short moment, towards the intermediate conveying device, the function of which is to deposit the letter separately into one of a plurality of letter-holders of the common main chain. These letter-holders are so spaced that each letter-holder on the special conveyor is successively brought into position at the disposal of a sorter.

Figure 2:
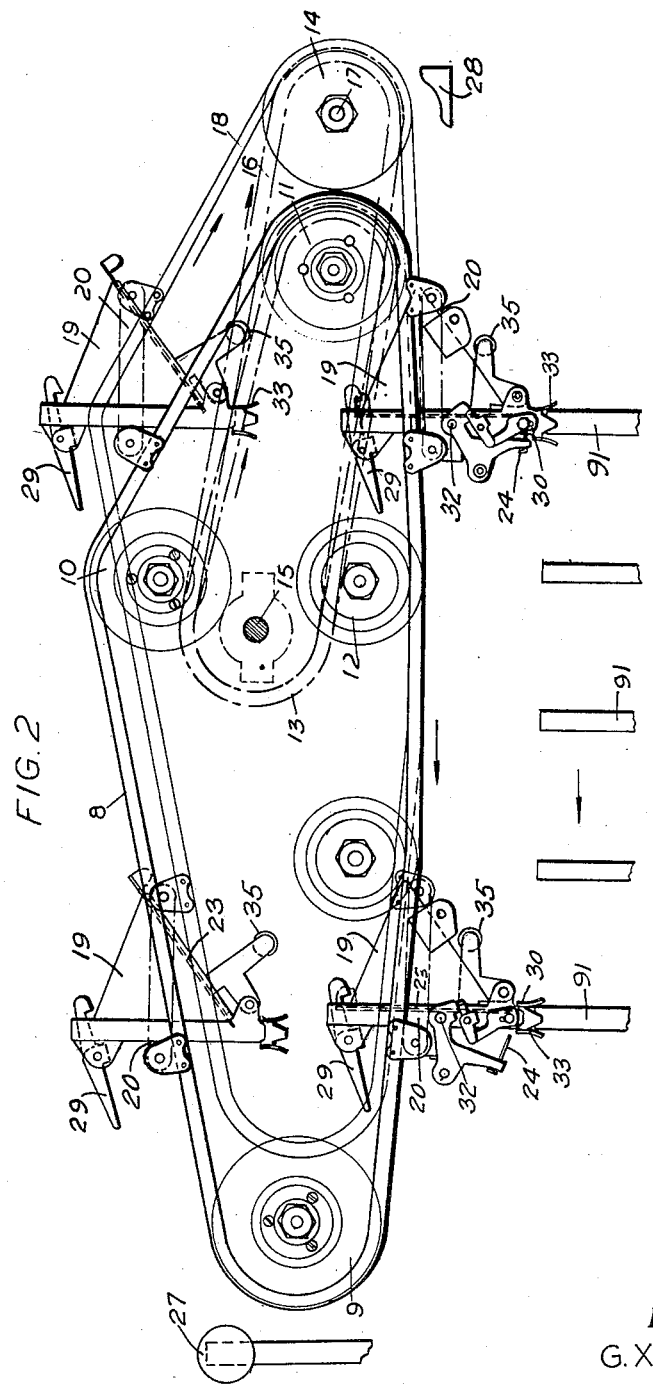
Fig. 2 shows the location of the various chains.
Figure 3:
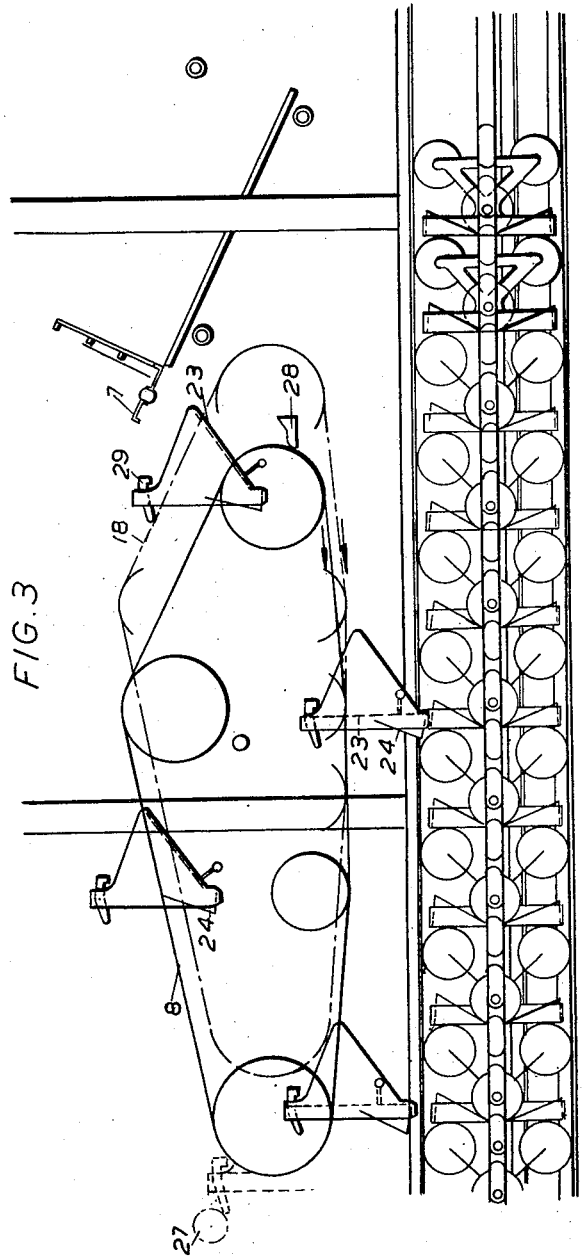
Fig. 3 represents the conveying device and a part of the positioning track of the main chain located between this conveying device.

This intermediate sorting device, as will further become clear from Figs. 2 and 8, comprises two mutually parallel and juxtaposed endless chains, only one of which has been indicated in Figs. 1 and 2, by 8. These chains are guided on sets of toothed wheels or on idlers 9, 10, 11, 12, the toothed wheels 11 of which are driven from the driving shaft 15 via an intermediate chain 13.

With the aid of a further intermediate chain 16 a shaft 17 is driven, onto which a toothed wheel 14 is secured, which toothed wheel drives an intermediate chain 18. This intermediate chain has the same length as the chains 8, and is parallel to them but is staggered with respect to the chains 8 a certain distance.

Four letter-holders 19 are fixed on the chains 8, which letter-holders are maintained in a vertical position during their movement by means of the four rigid straps 20 connecting the intermediate chain 18 to one of the chains 8.

One of these rigid straps 20 is separately shown in Fig. 7. From this figure it will be clear that at each extremity of the strap there is provided a crank 21, one being rigidly coupled to the end of shaft 21, which supports the letter-holder on chains 8, while the other crank is rotatably coupled to one of the equidistant points of the auxiliary chain 18. Due to this rigid coupling with respect to the synchronous movement of the chains 8 and 18, the letter-holders remain in a vertical position.

As shown in Figs. 5 and 6, the letter holders 19 consist of a rectangular vessel, of which end portions 22, 22' constitute the narrow sides of the rectangle and fixed wall 23a consitutes one of the wide sides of the rectangle. A fourth side 23, is pivotally movable and is adapted to pivot on the pivots 23b and 23b', attached near the lower extremity of portions 22, 22' respectively. The movable wall 23 is adapted to swing in an arc between two triangular-shaped extension arms 26, 26' attached to portions 22, 22', respectively, to an angle limited by the stop member 25 which extends between extension arms 26, 26'. The top portions of the vessel are open. The bottom portions of the letter holders are adapted to be closed by a shutter portion 24 which will be presently described in further detail.

Mounted near the upper extremity of portion 22, is a latch mechanism consisting of a lever 29 pivotally mounted intermediate its ends on a pivot 29a attached to extension 22a extending from one side of the portion 22. The lever 29 is provided with a latch portion 29b at one end, which latch portion is adapted to catch the latching pin 34 which is attached to the free end of the movable wall 23 as shown clearly in Fig. 5. The lever 29 has its other end 29c extending outwardly and in a position to be cammed downwardly by the cam surface 27, which surface is fixed with respect to the chain 8 as shown clearly in Fig. 2. A spring 29d is fixed between portion 22 and lever 29 so as to normally urge lever 29 in a counterclockwise direction as shown in Fig. 5, thereby to cause the latch portion 29a of the lever to engage the latching pin 34.

Movable wall 23 is provided with an extension member 35a extending perpendicularly from the outside of said wall near its pivoted end and which extension member carries a roller 35. A spring 35b is positioned between an edge of extension arm 26' and a surface of extension member 35a to normally urge the said extension member 35a in a counterclockwise direction thereby causing the movable wall 23 to assume its open position against stop member 25. The arrangement is such that the movable wall 23 is caused to assume a substantially vertical position only when the cam 35 rides over the shoe 28, which shoe is fixed with respect to the chain 8 as shown in Fig. 2. It will be understood that as the cam 35 rides over the high portion of the shoe 28, the latch portion 29b will engage the latching pin 34 and the movable wall 23 will be locked into its vertical position.

The shutter 24 is composed of a closure portion 24a which portion is connected to the base end of a pair of oppositely positioned T-shaped rocker arms 24b, 24b', pivotally mounted on pivots 24c and 24c', respectively. The pivots 24c and 24c' are mounted on sides 22, 22' respectively. It is one end of the top of the T of rocker arms 24b, 24b' which is mounted on the pivots 24c, 24c'. The other end of the T of each rocker arm is interconnected by means of connecting element 24d. A wire spring 24e is coiled about pivot 24c and has a first end abutting against shaft 21' and has its other end abutting against connecting element 24d and is adapted to normally urge the rocker arms in a counterclockwise direction thereby to retract closure portion 24a from beneath walls 23 and 23a. It will be understood that when closure portion 24a is retracted, a letter 90 may fall through the bottom of the vessel due to gravitational pull.

Figure 4:
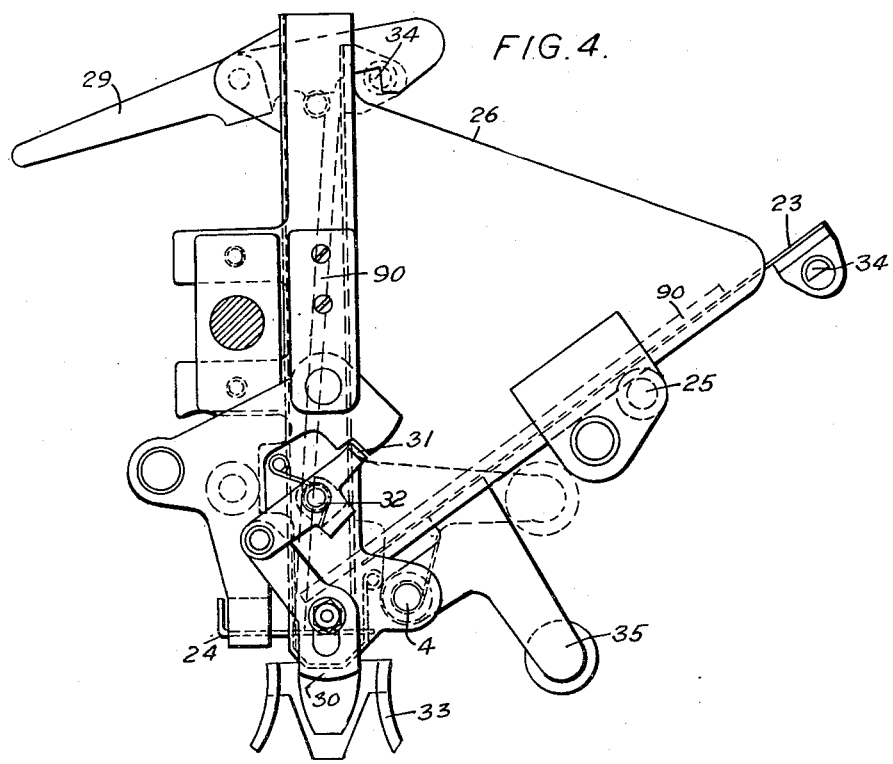
Fig. 4 shows a front view of one of the letter-holders.

As shown in Figs. 4 and 6, there is a latch mechanism provided for retaining the closure portion 24a in closed position against the tension of spring 24e. The latch mechanism consists of a substantially L-shaped trigger member 30, having a bottom leg 30a extending in a plane parallel to the bottom edge of fixed wall 23a. The vertical portion of the L of trigger member 30 is provided with a vertical slot 30b. A fastening device 30c attached near the lower extremity of portion 22' is adapted to slidable engage member 30 in said slot and to limit its vertical motion. The upper portion of the trigger member 30 is angularly disposed at 30d and carries a pivot 30e near its extremity. A latching arm 31 is pivotally mounted on pivot 32 intermediate its ends and which pivot is affixed to the portion 22'. One end of the lever 31 is pivotally connected to the pivot 30e and the free end is adapted to coact with an extension 24b of the rocker arm 24. The extension 24b is adapted to abut against the free end of the latch member 31 and is adapted to be locked in the position shown in Fig. 4 against the tension of spring 24e. As the trigger member 30 moves vertically upward, the latch member 31 will pivot in a clockwise direction and out of contact with the surface of extension member 24d. Both rocker arms will thereupon move in a clockwise direction as viewed in Fig. 4 thereby retracting closure member 24a.

As shown in Fig. 2, when the holder 19 (shown in the lower righthand position of the drawing) comes in contact with the upper portion of holder 91, the upper surfaces of holder 91 urges the trigger member 30 in an upward direction by means of a force exerted against the portion 30a thereof. As stated before, the closure portion 24a will retract and the letter 90 will fall through the opening in the bottom of the vessel into holder 91.

As the letter-holder passes the roller 27, the sidewall 23 is opened by lifting a spring controlled latch lever 29 and the letter-holder arrives in the receiving position, in which it is positioned below the turnstile 7. When passing the shoe-like member 28, the sidewall of the letter-holder is again closed, and maintains its vertical position during the cycle. These two positions respectively correspond with the first and third phases of the conveying cycle.

In Fig. 4 the position of the sidewall 23 in its upright position is shown in dotted lines, and a letter 90 has also been shown in dotted lines for both positions. Moreover, Fig. 5 shows that the hooked end of lever 29 hooks behind a pin 34 with flattened side indicated near the free end of the sidewall 23. Fig. 5 shows in dotted lines how the position of this lever 29 is changed by the roller 27 so as to release the sidewall together with its associated latching pin.

During the waiting period when a letter may be deposited, forming the first phase of operation, the movable sidewall 23 forms an inclined receiving surface, extending as far as the shutter 24, which closes the bottom aperture of the letter-holder.

It may be noted that the place where the turnstile 7 permits the letter to fall into the opened letter-holder of the intermediate conveying device, is not chosen arbitrarily but near the bends of the chains 8 since, there, the letter-holders will move so to speak at reduced speed in forward and backward direction, combined with a relatively low speed downwardly.

Due to this low transfer speed of the letter holder, the risk of the letter being damaged will be negligible.

After receiving the letter, the sidewall 23 is turned upwardly and the letter-holder continues its movement and then approaches the main chain whereupon the letter-holders are further moved on with the sidewall in its inclined position. The operation will be clear from consideration of Fig. 2. Letter holders of the main conveyor chain are indicated 91.

This is the fourth phase of the cycle.

In order to prevent displacement between the bottom aperture of the upper letter-holder 19 and the top aperture of the letter-holder 91 of the main chain, a guiding arrangement 33 is provided, engaging the sides of the letter-holder of the main chain. This guiding arrangement is shown in Figs. 5 and 6.

After transfer of the letter to holder 91, the letter-holder of the intermediate conveying device still accompanies the letter-holder of the main chain along a certain distance but thereafter leaves same, after which the shutter is closed under the action of an external guiding member (not shown).

The letter-holder commences again with the first phase of the cycle, during which, when passing the fixed member 27, the sidewall will be placed in its inclined position. This member 27, therefore, may serve both for unlatching the sidewall, and for closing the bottom shutter 24.

Due to the synchronism provided between the movements of the chains carrying the letter-holders and the main chain, the same interval will always occur between two successive letter-holders of the intermediate conveying devices and two successive letter-holders of the main chain, which are brought at the disposal of a same sorter.

In order to avoid, however, that letter-holders of the main chain pick up letters from preceding sorting positions, the place of transfer of the letters must be shifted for each sorting position.

The invention is in no way restricted to the shown embodiment which therefore has no limitative nature whatsoever.

I claim:

1. A conveying device for flat objects, comprising a continuous flexible conveyor, a plurality of object holders mounted on said conveyor at special intervals, and means for maintaining said object holders in the same relative position during movement of said conveyor, said object holders each having a fixed wall maintained continuously in a substantially vertical position, a movable wall pivoted at a point adjacent the lower end of said fixed wall, said movable wall being movable into a position substantially parallel with said fixed wall, and into a position at an angle to said fixed wall, and latch means for retaining said movable wall in said parallel relation, release means external of said holder positioned adjacent said conveyor at a predetermined position in the path of said holder for releasing said latch means to permit said movable wall to assume its angular position, closure means external of said holder and positioned adjacent said conveyor at a spaced interval from said release means for moving said movable wall into said parallel latched position, a movable shutter member positioned perpendicularly to said fixed wall and located beneath both said walls, said shutter member adapted to provide a bottom for said holder, and means for removing said shutter member from beneath said walls thereby to permit an object in said holder to pass downwardly from said holder.

2. A device according to claim 1, wherein said object holders are adapted to receive objects at a receiving position, said release means being positioned at a point along said conveyor in advance of said receiving position, and said closure means being positioned along said conveyor at a position beyond said receiving position.

3. A conveying device according to claim 1, wherein said conveyor serves to deliver objects from said receiving position to a delivery position, said shutter member comprising a pivotally mounted element, means for normally maintaining said shutter in closed position, said removing means situated external to said conveyor at said delivery position for opening said shutter to release an object from said holder.

References Cited in the file of this patent

UNITED STATES PATENTS

| 1,875,183 | Spriggs | Aug. 30, 1932 |
| 2,242,813 | Cook | May 20, 1941 |